United States Patent [19]

Imura et al.

[11] 4,408,855

[45] Oct. 11, 1983

[54] AUTOMATIC FOCUS ADJUSTING DEVICE FOR USE IN A CAMERA

[75] Inventors: Toshinori Imura; Shinji Tominaga, both of Sakai, Japan

[73] Assignee: Minolta Camera Kabushiki Kaisha, Higashi, Japan

[21] Appl. No.: 382,937

[22] Filed: May 28, 1982

[30] Foreign Application Priority Data

Jun. 1, 1981 [JP] Japan ................................. 56-84835

[51] Int. Cl.³ .............................................. G03B 3/10
[52] U.S. Cl. ..................................................... 354/25
[58] Field of Search ................. 354/25 R, 25 A, 25 P, 354/25 N, 195, 31 F

[56] References Cited

U.S. PATENT DOCUMENTS 4,085,320 4/1978 Wilwerding ................. 354/25 P X
4,171,885 10/1979 Kondo ............................. 354/25 P
4,183,643 1/1980 Imura et al. .......................... 354/25
4,212,523 7/1980 Yamada et al. ...................... 354/25
4,238,153 12/1980 Imura ................................. 354/195

FOREIGN PATENT DOCUMENTS 2937288 4/1980 Fed. Rep. of Germany ........ 354/25

*Primary Examiner*—William B. Perkey
*Attorney, Agent, or Firm*—Jackson, Jones & Price

[57] ABSTRACT

An automatic focus adjusting device for a camera is provided that detects the contrast of a target object and generates an appropriate signal. If the target contrast is lower than a predetermined level the objective lens is set at an infinity focusing position. When the camera is set for flash photography it overrides any adjustment signal beyond the maximum flash photography distance.

9 Claims, 3 Drawing Figures

AUTOMATIC FOCUS ADJUSTING DEVICE FOR USE IN A CAMERA

BACKGROUND OF THE INVENTION

1. Field of the Invention

The present invention relates to an automatic focus adjusting device for use in a camera, and more particularly to an automatic focusing camera which permits flash photography by means of an electronic flash device.

2. Description of the Prior Art

Known in the prior art are various types of range-finding devices which measure a camera-to-target object distance on receipt of light from the target object with a light receiving device, and which generate a distance signal in response there-to. Also known are various types of automatic focusing cameras which automatically focus an objective lens according to the distance signal. In many cases, however, the distance measuring in such range-finding devices is performed by use of a target object image formed on the light receiving device. Therefore, when the contrast of the target object itself is lower than a predetermined level, the range-finding devices do not generate any distance signal, resulting in no focus adjusting suitable for the target object.

U.S. Pat. No. 4,183,643 discloses an automatic focus adjusting device which obviates such inconvenience. This device is of a type that premeasures a camera-to-target object distance with a range-finding device, and thereafter, shifts an objective lens from the infinity focusing position toward the closest focusing position, and then stops the objective lens at a position corresponding to the distance signal generated by the range-finding device. Furthermore, such automatic focus adjusting device is constructed such that the objective lens is automatically set to a pan-focal position when the range-finding device generates no distance signal. According to the device, the objective lens is set to a pan-focal position even when no distance signal is generated by the range-finding device due to the low contrast of the target object. However, in this device, the distance measuring and object lens position adjustment are carried out in turn, thus requiring a longer time for focus adjustment. There have also been various types of arrangements known for shifting a movable lens together with the scanning of a camera-to-target object distance for its measurement. The following problems, however, occur in an arrangement in which a range-finding device scans the distance from a far position toward a closer point, while the movable lens is shifted from the infinity focusing position toward the closest focusing position in response to the scanning of the range-finding device:

(1) When the contrast of a target object image formed on the light receiving device is lower than a predetermined level, no distance signal is generated. As a result, the movable lens included in the objective lens is shifted to its closest focusing position, causing the objective lens to be set in the closest focusing condition. However, generally, the farther a target object is located, the lower the contrast of the image formed on the light receiving device becomes. Therefore, it is often true that the farther the target object is, the more the distance signal is unobtainable. This causes the objective lens often to be set in the closest focusing condition while the target object is positioned afar.

(2) In flash photography using an electronic flash device, when the range-finding device fails to measure a camera-to-target object distance and generates a distance signal relative to the background of the target object, incorrect exposure results if the distance to the background is larger than the maximum permissible distance for flash photography.

It is to be noted that such problems occur not only in the distance-measuring type of automatic focus adjusting devices, but also in the focus detecting type that includes a focusing condition detecting device for detecting the focusing condition of the objective lens based on the contrast of an image formed by the objective lens, while shifting the movable lens from the infinity focusing position toward the closest focusing position and stopping it when an in-focus signal is generated from the focusing condition detecting device.

SUMMARY OF THE INVENTION

An object of the present invention is to provide an automatic focus adjusting device which obviates the described problems.

Another object of the present invention is to enable proper focus adjustment for a target object even if the target object is located from the camera and therefore the contrast of the target object image formed on the light receiving means is so low that no distance signal or no in-focus signal is obtained, by using a type of automatic focus adjusting device which shifts a movable lens from the infinity focusing position toward the closest focusing position for focus adjustment, while scanning to detect the proper focusing position of the movable lens.

Still another object of the present invention is to provide an automatic focus adjusting device which permits, a flash photography mode, focus adjustment only within a distance range shorter than the maximum permissible distance for flash photography.

The automatic focus adjusting device according to the present invention is constructed such that it detects the contrast of a target object, and generates a signal for stopping the shifting of the movable lens at the infinity focusing position when the contrast is lower than a predetermined level, thus setting the objective lens to the infinity focusing condition. Furthermore, the flash photography mode, the device operates to prevent the stopping of the movable lens shifting even if the proper position thereof is detected until the movable lens is adjusted to a position corresponding to the maximum permissible distance for flash photography. When the movable lens is shifted to the position corresponding to maximum permissible distance for flash photography, the shifting of the movable lens is stopped in the position if its proper position has been detected. With the above arrangement, when a distance to the target object is shorter than the maximum permissible distance for flash photography, the movable lens is set at the position corresponding to that distance.

DESCRIPTION OF THE PREFERRED EMBODIMENT

Figure 1:
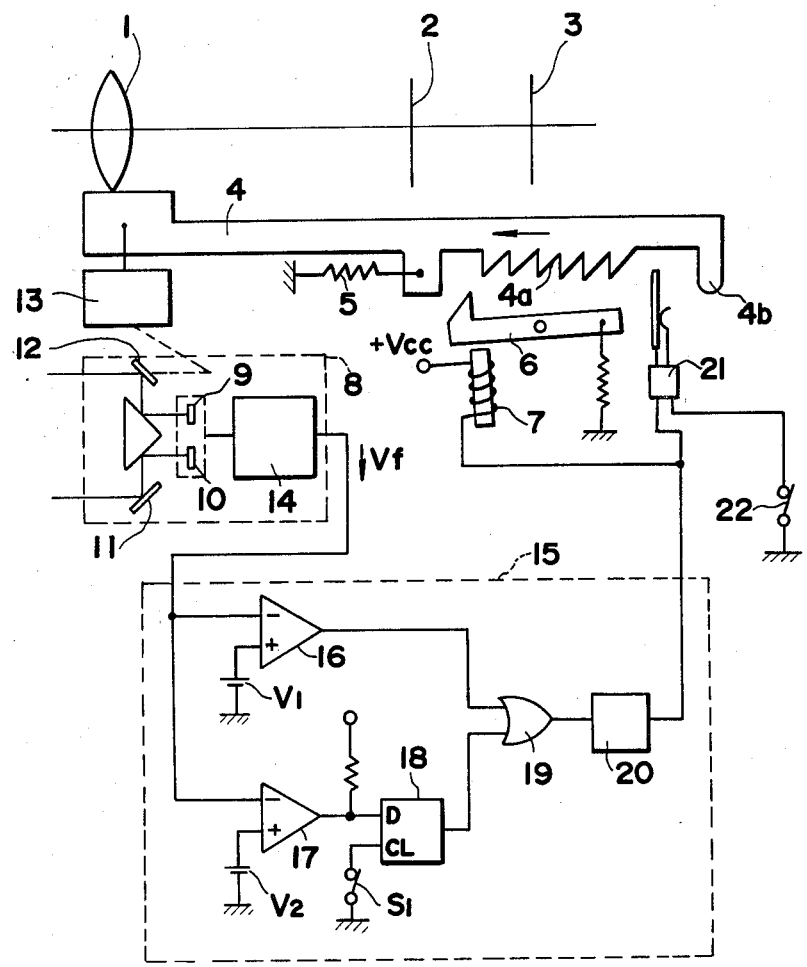
FIG. 1 is a schematic diagram showing an embodiment of the present invention.
Figure 2A:
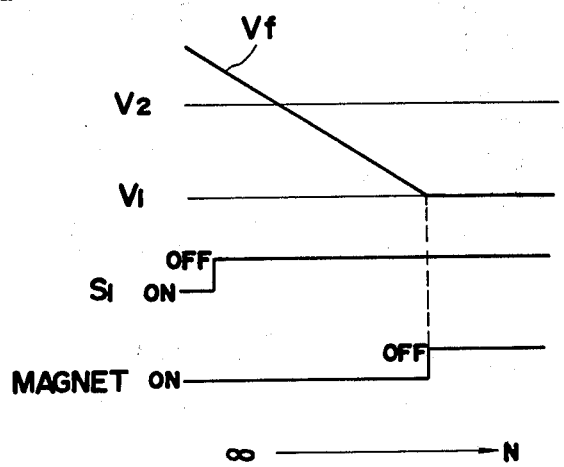
FIGS. 2a and 2b are time charts representative of various signal states in the embodiment of FIG. 1.
Figure 2B:
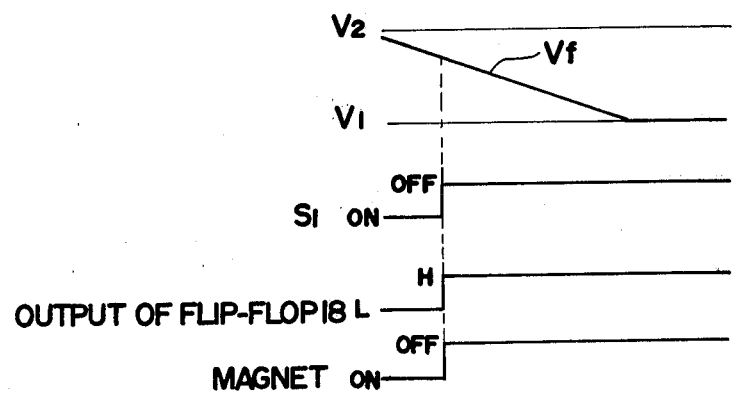

FIG. 1 shows the principal parts of an embodiment of the present invention. Shown therein are an objective lens 1, shutter device 2, film 3 and lens shifting member 4 which is provided integrally with the objective lens 1 and is urged by spring 5 for shifting the objective lens 1 from the infinity position toward the closest position. Stop lever 6 is urged by a spring to engage into ratchet teeth 4a of lens shifting member 4 in order to stop the objective lens 1. Electromagnet 7 is energized to attract the stop lever 6 as shown in FIG. 1, and is deenergized by an in-focus signal to be described later. Range-finding device 8 detects a camera-to-target object distance based on two images formed by lights directed by fixed mirror 11 and movable mirror 12 to light receiving elements 9 and 10, respectively. Movable mirror 12 scans from the infinity position toward the closest position with the movement of lens shifting member 4 which is linked therewith via interlocking mechanism 13. An in-focus detecting device 14 generates a voltage Vf proportional to the absolute value of a difference in contrast between two images formed respectively on light receiving elements 9 and 10. Electromagnet control circuit 15 controls electromagnet 7. The output of in-focus detecting circuit 14 is connected to the negative inputs of a pair of differential amplifiers 16 and 17 in an electromagnet control circuit 15. In addition, reference voltages V1 and V2 of differential amplifier 16 and 17 are preset to be lower and higher, respectively, than output voltage Vf of the in-focus detecting circuit 14 when the contrast of a target object is lower than a predetermined level, whereby the contrast level of the target object is detected. When trigger switch S1 is turned off by the shutter release operation, D-flip-flop 18 instantly stores the output of differential amplifier 17 and generates an output identical to the input. Also included in FIG. 1 are OR gate 19, amplifier 20 and control switch 21 which keeps electromagnet 7 energized for the period lens shifting member 4 to reach a predetermined position necessary to permit (e.g. approximately 3 m focusing position) for a lens focus adjustment. The position is determined within a distance range corresponding to the maximum permissible distance for flash photography. Switch 22 is connected in series to control switch 21 and is closed when a flash photography mode is selected. FIGS. 2a and 2b show the operational timing of electromagnet 7, for two cases wherein the contrast of a target object is detected to be higher and lower than a predetermined level, respectively.

The operation of the device described above is as follows. Both objective lens 1 and movable mirror 12 of range-finding device 8 are located at a position slightly set back from their infinity position prior to the shutter release operation and before starting their movement.

When range-finding device 8 is activated upon depression of a shutter release button (not shown), signal voltage Vf is generated from in-focus detecting signal circuit 14, and the contrast of a target object is determined to be higher or lower than a predetermined level depending on whether output voltage Vf is higher or lower than reference voltage V2 of differential amplifier 17. When the contrast of the target object is higher than the predetermined level, in-focus detecting signal Vf is higher than reference voltages V1 and V2, whereby differential amplifiers 16 and 17 generate "low" level signals. On the contrary, when the contrast of the target object is lower than the predetermined level, in-focus detecting signal Vf becomes higher than voltage V1 but lower than V2, causing differential amplifier 16 to generate a "low" level signal and differential amplifier 17 to generate a "high" level signal. Subsequent operations will be described separately in the former and latter cases.

(1) Contrast of a target object is higher than the predetermined level:

With reference to FIG. 2a, in the state that the "low" level signals are generated from differential amplifiers 16 and 17, the lens shifting member 4 is started to be shifted by the action of spring 5 toward the closest position in response to the depression of the shutter release button. In synchronization therewith, trigger switch S1 is turned off, whereby the "low" level signal of differential amplifier 17 applied to a D-input of D-flip-flop 18 is immediately stored therein, and at the same time, is sent as an input to OR gate 19. The input to OR gate 19 is a "low" level signal, causing electromagnet 7 to be energized through amplifier 20, whereby stop lever 6 is attracted by electromagnet 7 and does not engage the lens shifting member. As the scanning of movable mirror 12 and the shifting of lens shifting member 4 advance, however, the absolute value of a difference in contrast level of two images each formed on light receiving elements 9 and 10 becomes small and is minimized under reference voltage V1 when the contrasts of two images are identical to each other. At this time, the output of differential amplifier 16 is inverted from the "low" level signal to a "high" level signal, whereby electromagnet 7 is deenergized through OR gate 19 and amplifier 20, and stop lever 6 stops the shifting of lens shifting member 4, thus completing the focus adjustment of objective lens 1. In this condition, objective lens 1 has been focused on a target object located on a distance detected by range-finding device 8. As well known, shutter device 2 is thereafter released to complete the shutter release operation. The foregoing is the operation when the contrast of a target object is above a predetermined level. Description will now be given of the operation when the contrast of a target object is lower than a predetermined level.

(2) Contrast of a target object is lower than a predetermined level:

With reference to FIG. 2b, output voltage Vf of in-focus detecting circuit 14 becomes higher than reference voltage V1 of differential amplifier 16 but lower than reference voltage V2 of differential amplifier 17, as described earlier. Therefore, differential amplifier 16 generates a "low" level signal, and differential amplifier 17 generates a "high" level signal. The shutter release operation continues to further proceed and lens shifting member 4 starts shifting. In synchronization with which trigger switch S1 is turned off. Thereafter, the "high" level signal of differential amplifier 17 applied as a D-input to D-flip-flop 18 is stored therein, and is also sent to OR gate 19, thus deenerigizing electromagnet 7 through amplifier 20. As a result, lens shifting member 4 is stopped by stop lever 6 before it operates sufficiently, causing objective lens 1 to be adjusted to the infinity focusing position. This is the operation when the contrast of a target object is lower than a predetermined level. Finally, the operation in a flash photography mode is as follows:

(3) Operation during flash photography:

For flash photography, flash photography selector switch 22 is closed so that control switch 21 is operable in the circuitry. In other words, when flash photography selector switch 22 is closed, the power+Vcc is supplied to the individual electric circuits upon depression of the shutter release button. At this time, electromagnet 7 is energized forcibly, in spite of the signal from electromagnet control circuit 15. When lens shifting member 4 is shifted to a position corresponding to a predetermined distance (e.g. approx. 3 m) within the maximum permissible distance for flash photography, control switch 21 is turned off by depression of projection 4b provided on lens shifting member 4. Therefore, control switch 21 is kept closed to energize electromagnet 7 until lens shifting member 4 is shifted to reach the position corresponding to the predetermined distance. With control switch 21 turned off, electromagnet 7 is then controlled by control circuit 15. In other words, if control circuit 15 has already generated a control signal ("high" level signal) at this time, electromagnet 7 would be deenergized immediately after control switch 21 is turned off, or if a control signal is generated during further shifting of lens shifting member 4 toward the closest position, electromagnet 7 is then deenergized, whereby the focus adjustment of objective lens 1 is performed within a distance range shorter than the maximum permissible distance for flash photography, in flash photography mode.

It is to be noted that the in-focus detecting system according to the embodiment of the present invention is based on the principle that the absolute value of a difference between contrasts of two images each formed on light receiving elements 9 and 10 is minimized when the fixed and movable mirrors aim at the same target object. Needless to say, however, the present invention is not limited thereto concerning an in-focus detecting system. As described earlier, for example, the same arrangement is applicable to a focus detecting type of automatic focus adjusting device including a focusing condition detecting device which detects the focusing condition of an objective lens based on the contrast of a target object image formed by the objective lens and received by a light receiving device. A movable lens constituting at least part of the objective lens is constructed to scan from the infinity focusing position toward the closest focusing position to detect a focusing condition and to be stopped when a signal representative of in-focus condition is generated.

According to the present invention, the objective lens is set at the infinity focusing condition even when the contrast of a target object image formed on the light receiving device is too low for detecting the in-focus position of the movable lens due to a far location of the target object, thus making possible the focus adjustment most suitable for the target object. In accordance with the present invention, furthermore, in a flash photography mode, automatic focus adjustment is possible with the distance range shorter than the maximum permissible distance for flash photography. As a result, even if in-focus detection is carried out for the background of a target object in flash photography, mode flash photography prevents exposure failure for the target object to be photographed, assuring appropriate focus and exposure for the field of the object placed at least in the predetermined distance within the permissible range for flash photography.

What is claimed is:

1. An automatic focus adjusting device for use in a camera which permits flash photography by means of an electronic flash device comprising:
    an objective lens including a movable lens element movable along the optical axis of the objective lens to change the focusing thereof;
    means for shifting said movable lens element along the optical axis from its infinity focusing position toward its closest focusing position;
    means for detecting a proper position of said movable lens element on a target object by scanning from an infinity position towards the closest position and for generating an in-focus signal when said movable lens element is positioned on said proper position;
    means for comparing a contrast of an image of said target object with a predetermined contrast level prior to the lens shifting and for generating a substitute signal when said movable lens element is positioned on its infinity focusing position if the contrast of said image is lower than said predetermined contrast level;
    means for stopping the lens shifting when said in-focus signal or said substitute signal is received thereby, and
    means for restraining the effect of said in-focus signal or said substitute signal on said stopping means until said movable lens element is shifted to a position corresponding to a maximum permissible distance for flash photography, when said camera is set in a flash photography mode.

2. The invention of claim 1, wherein said detecting means is constructed to detect a contrast of an image of the target object prior to the lens shifting and to generate a contrast signal relative to the detected image contrast, and said contrast signal is sent to said comparing means for comparison.

3. The invention of claim 2, wherein said comparing means is constructed to compare said contrast signal with a predetermined constant signal indicating said predetermined contrast level.

4. The invention of claim 3, wherein said comparing means includes a differential amplifier whose two inputs are said contrast signal and a reference signal indicating said predetermined contrast level.

5. The invention of claim 1, wherein said movable lens element is constructed to be shifted from a starting position at its infinity focusing position, and further includes means for generating a starting signal that is generated when said movable lens element is started to shift from said starting position, and means for sending said substitute signal to said stopping means when said starting signal is received thereby, whereby said movable lens element is positioned exactly on its infinity focusing position if the contrast of the image is lower than the predetermined contrast level.

6. The invention of claim 5, wherein said starting signal generating means includes an electric switch operated by a shutter release operation.

7. The invention of claim 6, wherein said substitute signal sending means includes D-flip-flop whose data input is said substitute signal and whose clock input is a signal operated by said electric switch.

8. The invention of claim 1, wherein said restraining means is constructed to form a by-path through which said in-focus signal and said substitute signal pass in order to prevent these signals from being received by said stopping means until said movable lens element is shifted to a position corresponding to a maximum permissible distance for flash photography.

9. The invention of claim 8, wherein said restraining means includes a first switch which is closed when a flash photography mode is selected and a second switch, connected in series to said first switch, which is closed until said movable lens element is shifted to a position corresponding to a maximum permissible distance for flash photography.

* * * * *